United States Patent [19]

Takemae et al.

[11] 4,284,335
[45] Aug. 18, 1981

[54] FOCUS DETECTING APPARATUS

[75] Inventors: Mikio Takemae, Yokohama; Hiroaki Tanaka, Tokyo, both of Japan

[73] Assignee: Nippon Kogaku K.K., Tokyo, Japan

[21] Appl. No.: 16,164

[22] Filed: Feb. 23, 1979

[30] Foreign Application Priority Data

Feb. 24, 1978 [JP] Japan .................................. 53-19624

[51] Int. Cl.$^3$ .............................................. G03B 3/10
[52] U.S. Cl. ..................................... 354/25; 354/197; 250/201
[58] Field of Search ........................ 354/25, 195, 197; 350/46, 47; 352/139, 140; 353/76; 355/55, 56; 250/201

[56] References Cited

U.S. PATENT DOCUMENTS 4,167,316  9/1979  Johnson .................................. 354/25

*Primary Examiner*—L. T. Hix
*Assistant Examiner*—Stafford D. Schreyer

*Attorney, Agent, or Firm*—Fitzpatrick, Cella, Harper & Scinto

[57] ABSTRACT

An apparatus for measuring the distance between an extremum or object and the apparatus comprises a scanning system for scanning the entire distance range to be measured, the scanning system detecting objects at different distances from the apparatus within the range and producing in a time series an output which assumes an extremal value upon the detection, apparatus for producing a distance signal representing the scanned distance in a time series, a distance selecting device extraneously operable to select a desired distance range within the entire distance range to be measured, extremal value detecting apparatus for detecting the extremal value of the output of the scanning system corresponding to the selected distance range by the output of the distance selecting device, and apparatus for providing an output representing the distance between an object within the selected distance range and the apparatus from the output of the extremal value detecting apparatus and the distance signal.

8 Claims, 49 Drawing Figures

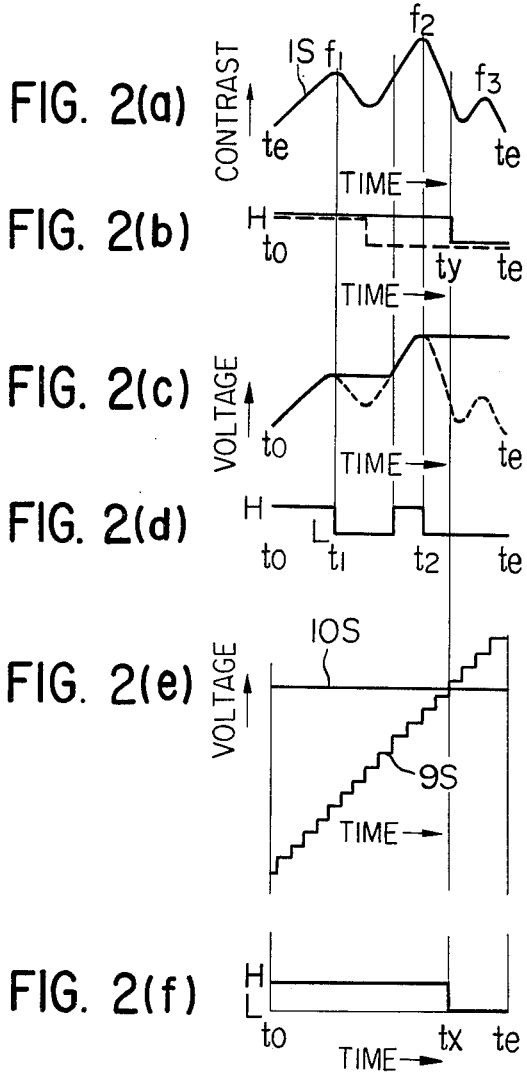
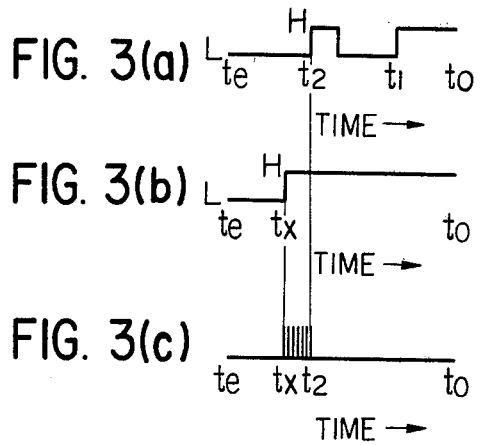
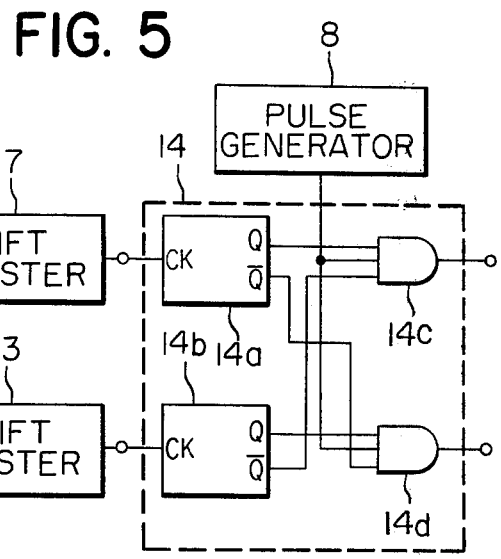
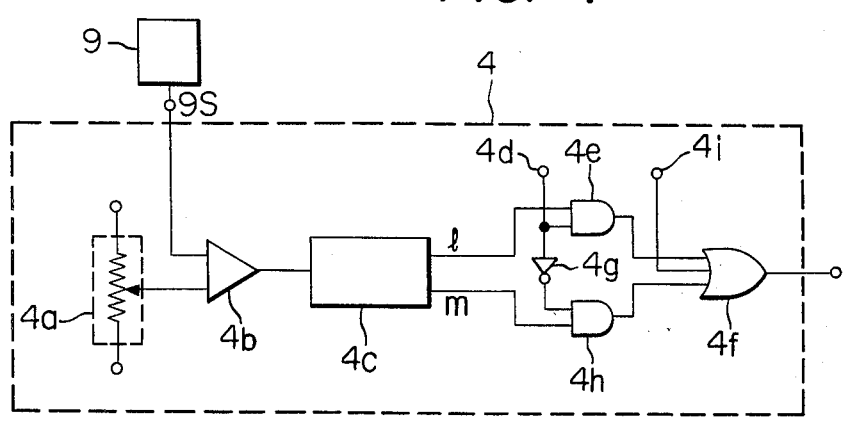

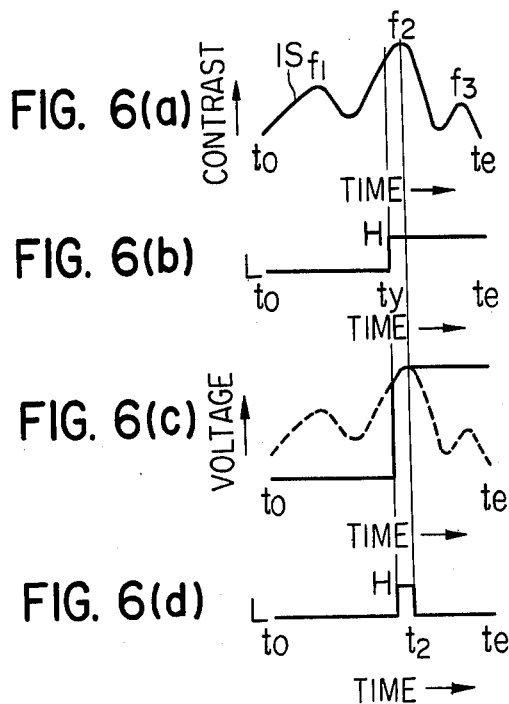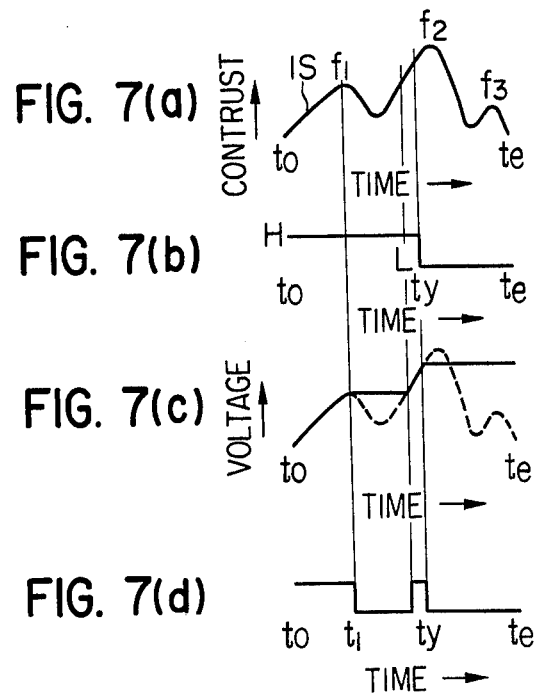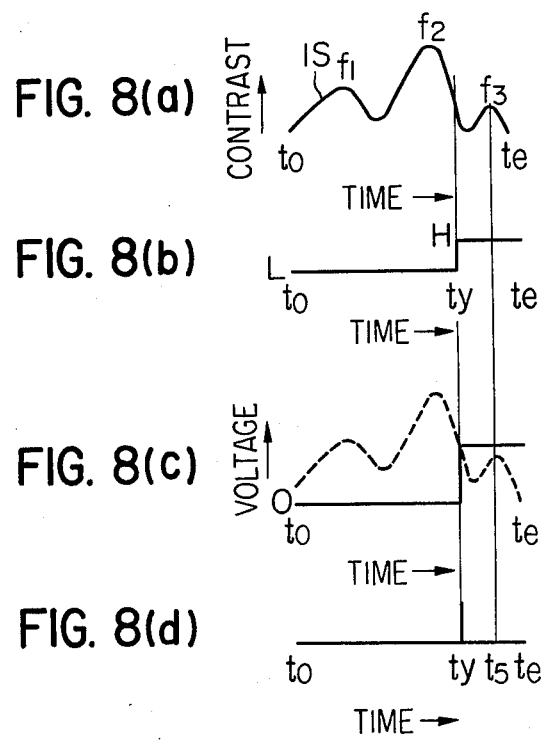

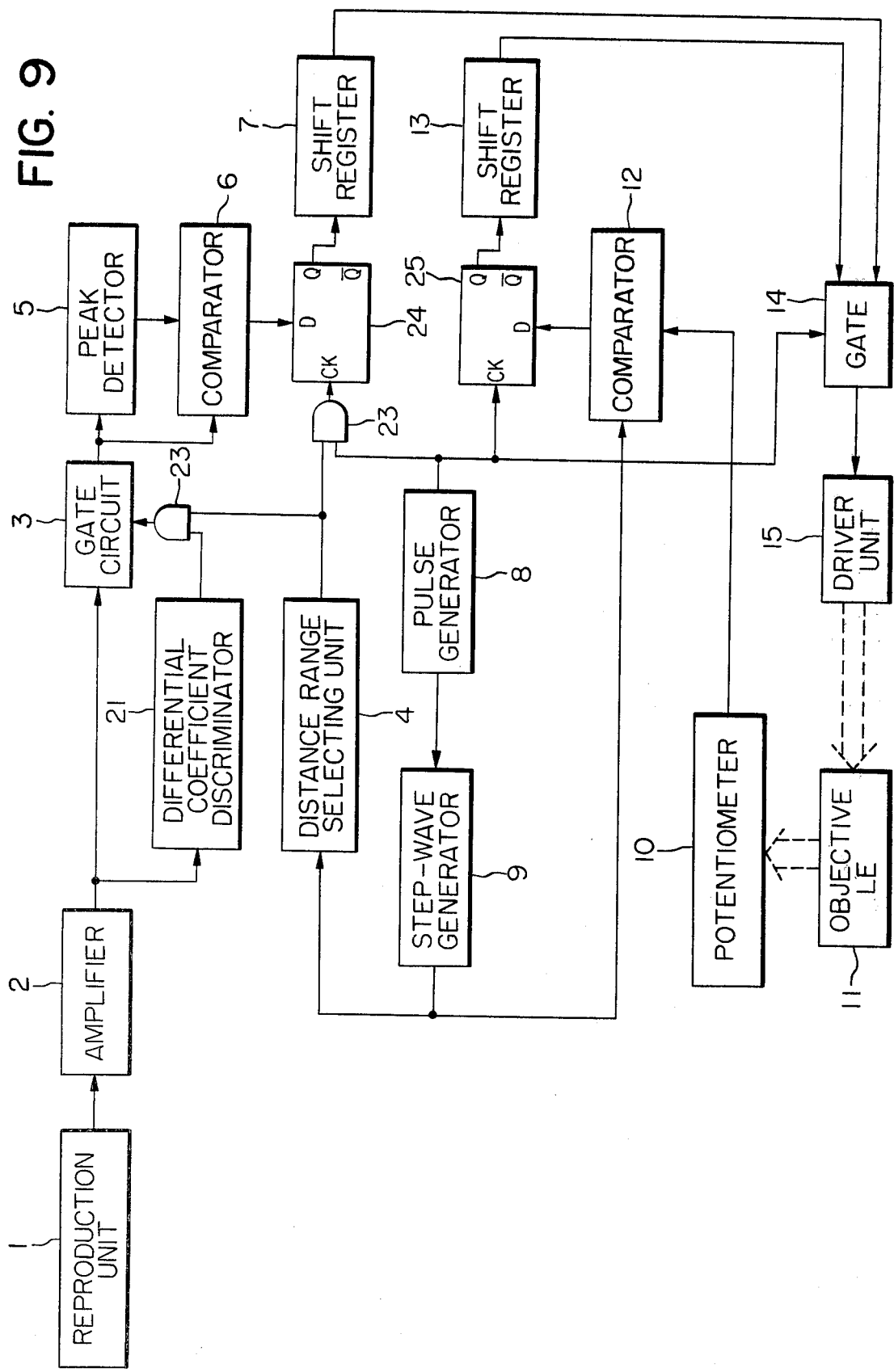

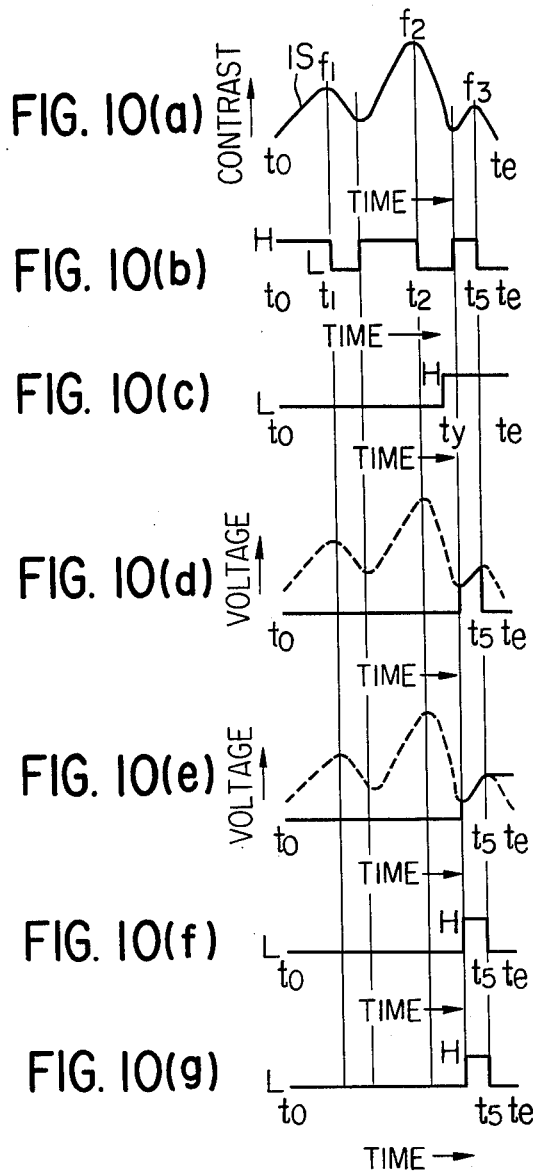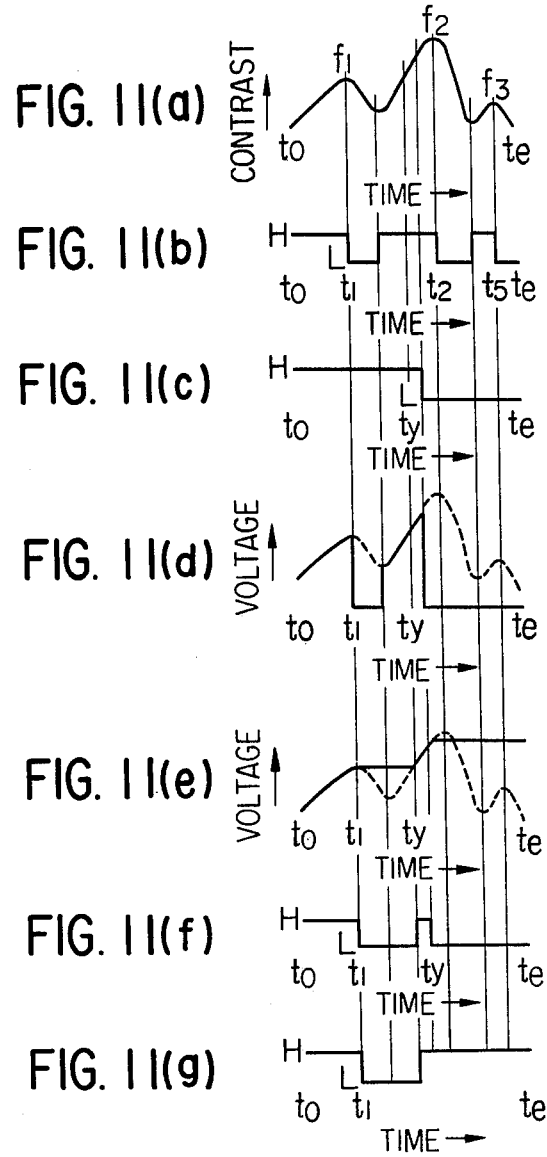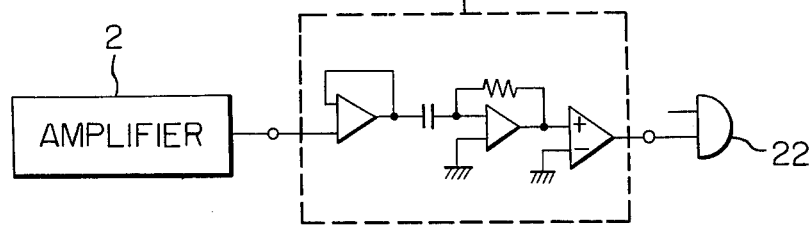
FIG. 12

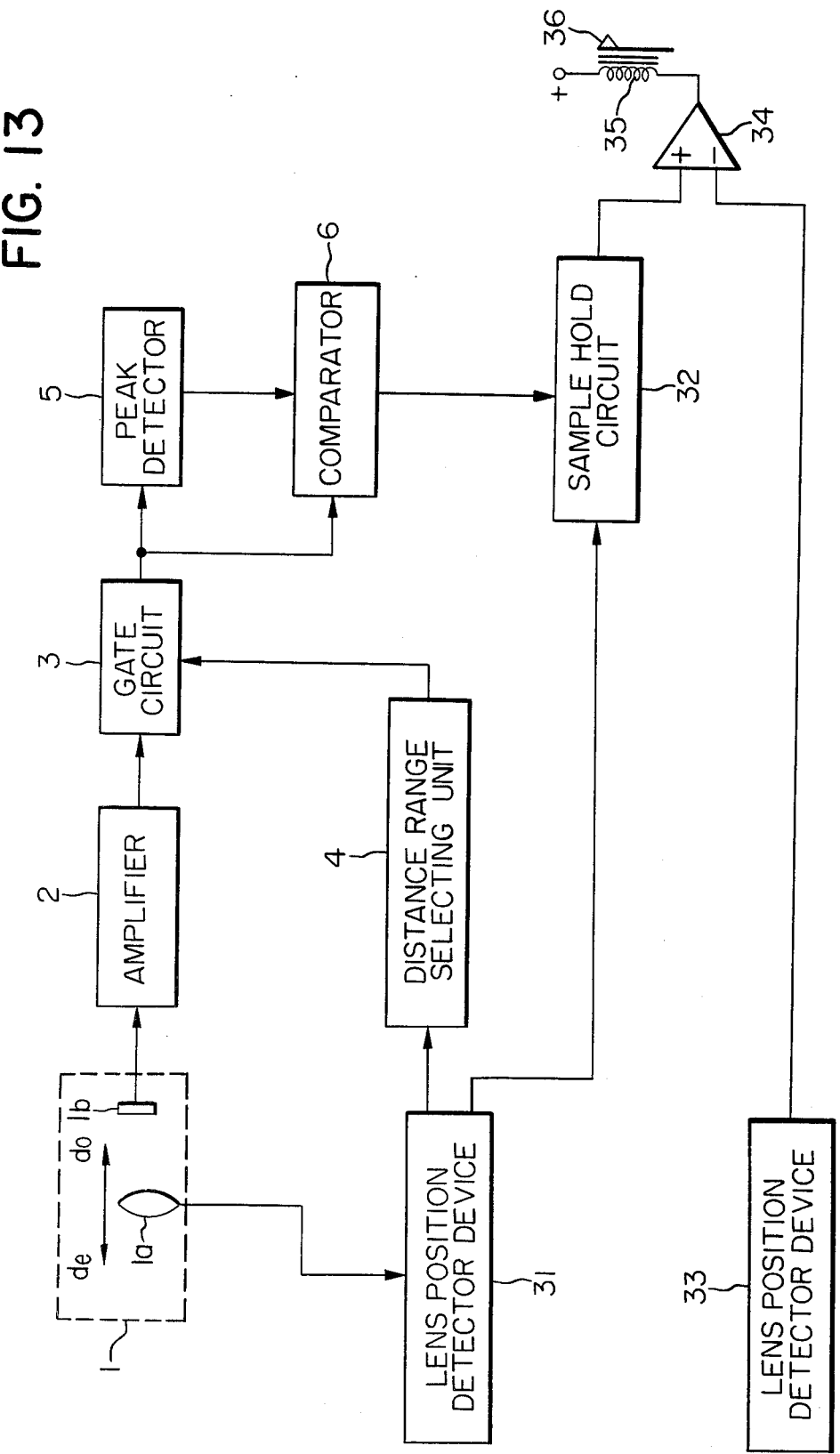

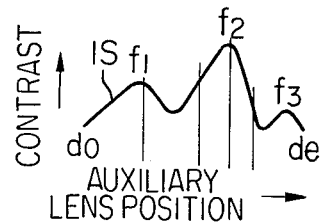
FIG. 14(a)
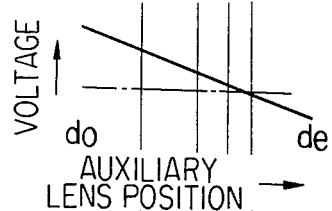
FIG. 14(b)
FIG. 14(c)
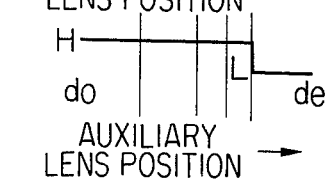
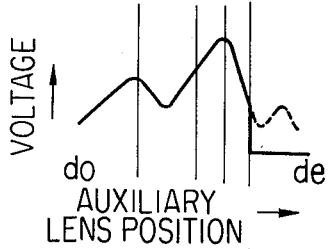
FIG. 14(d)
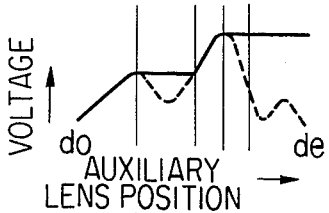
FIG. 14(e)
FIG. 14(f)
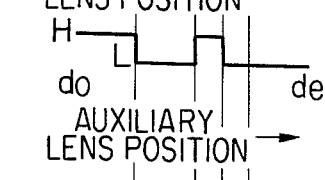
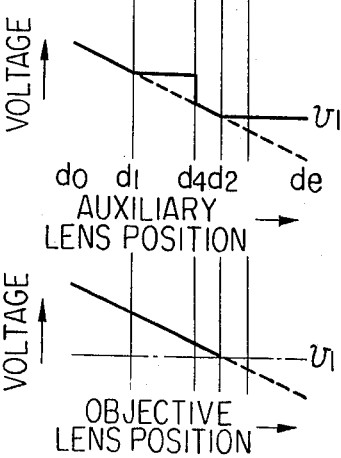
FIG. 14(g)
FIG. 14(h)

FOCUS DETECTING APPARATUS

BACKGROUND OF THE INVENTION

1. Field of the Invention

This invention relates to a range finding apparatus, and more particularly to an automatic focusing apparatus.

2. Description of the Prior Art

In cameras, for example, it is known to move a focus position detecting lens in the direction of the optic axis thereof, to detect a position having the highest contrast from the contrast of an object image formed by the light passed through said lens as the focused position of an image forming lens (which is called a picture-taking lens in case of cameras), and to move the image forming lens to the detected position to provide a properly focused image on a film.

However, in such cameras, where an intended object is to be photographed through a wire netting or where an object beyond a clump of trees is to be photographed therethrough, the focus is adjusted to an object having a higher contrast and thus, it could not be assured whether or not the focus could be adjusted to the intended object.

SUMMARY OF THE INVENTION

It is an object of the present invention to provide a focused position detecting apparatus which can reliably detect the focused position of the image forming lens to be focused to a desired object even when several objects lie before and behind the object to be photographed.

The invention will become fully apparent from the following detailed description thereof taken in conjunction with the accompanying drawings.

BRIEF DESCRIPTION OF THE DRAWINGS

FIGS. 2(a)–2(f) and 3(a)–3(c) illustrate the waveforms in various parts of the embodiment shown in FIG. 1.

FIG. 4 is a circuit diagram showing a specific example of the distance range selecting unit shown in FIG. 1.

FIG. 5 is a circuit diagram showing a specific example of the gate circuit of FIG. 1.

FIGS. 6(a)–6(d), 7(a)–7(d), and 8(a)–8(d) illustrate the waveforms in various parts of FIG. 1 corresponding to the output of the distance range selecting unit.

FIG. 9 is a block diagram showing a second embodiment of the focused position detecting apparatus according to the present invention.

FIGS. 10(a)–10(g) and 11(a)–11(g) illustrate the waveforms in various parts of the embodiment shown in FIG. 9.

FIG. 12 shows a specific example of the differential coefficient discriminator circuit shown in FIG. 9.

FIG. 13 is a block diagram showing a third embodiment of the focused position detecting apparatus according to the present invention.

FIGS. 14(a)–14(h) illustrates the waveforms in various parts of the embodiment shown in FIG. 13.

DESCRIPTION OF THE PREFERRED EMBODIMENTS

Figure 1:
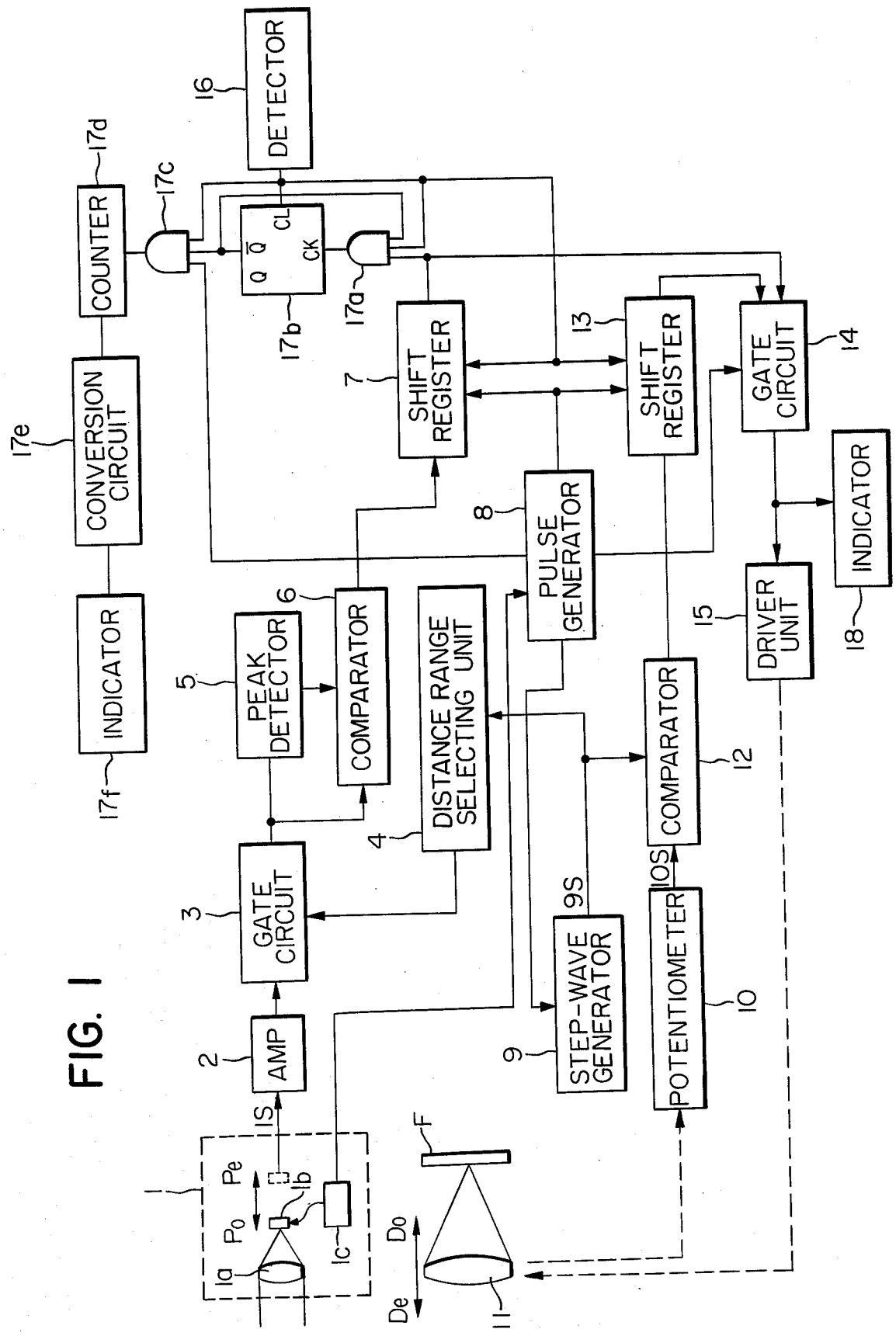
FIG. 1 is a block diagram showing a first embodiment of the focused position detecting apparatus according to the present invention.

Some embodiments of the present invention will hereinafter be described by reference to the accompanying drawings. Description of the embodiments will be made by reference to an automatic focusing device in a camera or the like for detecting the focused position of an image forming lens whose focus may be adjusted to a desired object and for coinciding the position of the image forming lens with the focused position.

Here, of the objects to which the lens may be focused, the nearest and the remotest (farthest) objects from the camera will be referred to as the nearest and the remotest objects, and the distances thereto will be referred to as the nearest and the remotest distances, and the distance range between the nearest and the remotest objects will be referred to as the focusable distance range.

In FIG. 1, a picture-taking or objective lens 11 in a camera to be automatically focused is movable in the direction of the optic axis between the infinity position $D_o$ and the nearest distance position $D_e$ and when the lens 11 is in the position $D_o$, the image of the object at infinity, namely, the remotest object, is properly focused or in focus to a film surface F, and when the lens is in the position $D_e$, the image of the nearest object is properly focused or in focus to the film surface F.

A reproduction unit 1 includes an auxiliary lens 1a, a photoelectric element 1b and a driving device 1c. The auxiliary lens 1a may form the image of substantially the same object as the picture-taking lens 11. The photoelectric element 1b may be moved at a uniform velocity in the direction of the optic axis of the lens 1a between the infinity position $P_o$ indicated by solid line and the nearest position $P_e$ indicated by dotted line, by the driving device 1c. The auxiliary lens 1a may form the image of the infinity object on the photoelectric element 1b when at the position $P_o$ and may form the image of the nearest object on the photoelectric element 1b when at the position $P_e$. Thus, when the photoelectric element 1b is moved from the infinity position $P_o$ to the nearest position $P_e$, the images of several objects lying within the focusable distance range of the picture-taking lens 11 may be successively formed on the photoelectric element 1b. The photoelectric element 1b produces an output $I_s$ corresponding to the contrast of the image formed thereon and therefore, when it starts from the position $P_o$ at a point of time $t_o$ and reaches the position $P_e$ at a point of time $t_e$, the output $I_s$ of this element assumes, for example, the waveform as shown in FIG. 2(a). The extremum or extremal values $f_1$, $f_2$ and $f_3$ of this waveform represent a remote object, an intermediate object and a near object, respectively. Since this output $I_s$ represents the contrast of the object on the photoelectric element 1b, it will hereinafter be referred to as the contrast signal.

The waveform of this contrast signal $I_s$ is similar to the contrast of the image on the film F when the picture-taking lens 11 is moved from the infinity position $D_o$ to the nearest distance position $D_e$ and therefore, the auxiliary lens 1a and the photoelectric element 1b reproduce the variation in contrast of the image on the film resulting from the aforementioned movement of the picture-taking lens. Such contrast signal may also be provided by moving the auxiliary lens 1a instead of the photoelectric element 1b in the direction of the optic axis.

The output $I_s$ of the photoelectric element 1b is applied through an amplifier 2 to a gate circuit 3. A distance range selecting unit 4 sets a desired distance range within the focusable distance range by extraneous operation such that the present automatic focusing device effects the focusing operation only for the objects within said desired distance range. When the distance range selecting unit 4 selects a distance range, for example, from the infinite to the intermediate position between the objects $f_2$ and $f_3$, it produces a gate signal for opening the gate circuit 3 from a point of time $t_o$ to a point of time $t_y$ as shown in FIG. 2(b). Thus, the gate circuit 3 passes therethrough the contrast signal $I_s$ of the photoelectric element 1b from the point of time $t_o$ to the point of time $t_y$. A peak detector 5 detects the maximum value of the so passed contrast signal $I_s$ and produces an output as shown in FIG. 2(c). A comparator 6 compares the output of the gate circuit 3 with the output of the peak detector 5 and produces a low or "L" level output only when the output of the peak detector 5 is not increased, as shown in FIG. 2(d). Accordingly, a point of time t2 whereat the output of the comparator 6 finally changes from "H" level to "L" level is the point of time whereat the contrast signal $I_s$ becomes maximum in the selected range of $t_o$-$t_y$.

A pulse generator 8 generates a pulse upon starting of movement of the photoelectric element 1b. Of course, the driving device 1c may be operated by the pulse output from the pulse generator 8. A last-in/first-out shift register 7 writes or stores the output of the comparator 6 with the pulse generated by the pulse generator as the shift pulse from the point of time $t_o$ whereat the movement of the photoelectric element 1b is started till the point of time $t_e$ whereat the movement of the photoelectric element 1b is terminated, and memorizes the point of time t2. The time t2 so memorized represents the position of the photoelectric element 1b when the object $f_2$ is imaged on the element 1b and therefore, the distance between the object $f_2$ to be focused and the camera may be recognized from the time t2. The time t2 is converted into a distance and indicated by a circuit which will hereinafter be described. A detector 16 including a limit switch detects that the photoelectric element 1b has reached the position $P_e$ at the point of time $t_e$, and produces a "H" level output to change over the shift register 7 into read-out condition. Thereby, in accordance with the shift pulse from the pulse generator 8, the shift register 7 effects read-out in the opposite direction from the writing. Namely, as shown in FIG. 3(a), the information at the point of time $t_e$ to the information at the point of time $t_o$ are read out successively. While the "L" level output of the shift register 7 regarding the points of time $t_e$-t2 is being supplied to an AND gate 17a, the $\overline{Q}$ output terminal of a flip-flop 17b is at "H" level and as already noted, the output of the detector device 16 is at "H" level and therefore, an AND gate 17c is opened so that the clock pulses from the pulse generator 8 are applied through the AND gate 17c to a counter 17d which counts the clock pulses. The information read out from the shift register 7 next to the information of the point of time t2 is at "H" level as shown in FIG. 3(a), whereby the $\overline{Q}$ output of the flip-flop 17b is inverted into "L" level to close the AND gate 17c. Accordingly, thereafter, the pulse is not supplied to the counter 17d. Of course, even if the "H" level information is again read out during the read-out, the AND gate 17a is closed by the $\overline{Q}$ output of "L" level so that the AND gate 17c is not opened. In this manner, the time $t_e$-t2 is counted by the counter 17d and it is converted into a distance by a conversion circuit 17e and indicated by an indicator 17f. The distance so indicated represents the distance to the object $f_2$ to be focused within the distance range selected by the distance range selecting unit 4.

Description will now be made of automatically focusing the picture-taking lens to the object $f_2$ by the output of the shift register 7. A potentiometer 10 produces a voltage 10s corresponding to the position of the picture-taking lens 11 prior to the focusing operation, as shown in FIG. 2(e). A step-wave generator 9 is responsive to the pulse from the pulse generator 8 to produce a step voltage 9s which is increased with the lapse of time from the starting point of time $t_o$ of the photoelectric element 1b, as shown in FIG. 2(e). A comparator 12, as shown in FIG. 2(f), produces a "H" level output when the step voltage 9s of the generator 9 is smaller than the output 10s of the potentiometer 10, and produces a "L" level output when the step voltage 9s is greater than the output 10s. The output of the comparator 12 is written into a last-in/first-out shift register 13 by the shift pulse from the pulse generator 8 in synchronism with the shift register 7. Thus, the inverting point of time $t_x$ of the output of the comparator 12 represents the position of the picture-taking lens 11 and accordingly, the position of this lens 11 is memorized in the shift register 13 as the inverting point of time $t_x$. This register 13 reads out in the opposite direction from the writing in synchronism with the read-out of the shift register 7 by the "H" level output of a detector device 16. A gate circuit 14 receives the read-out output signals of the shift registers 7 and 13 shown in FIGS. 3(a) and (b), respectively, and puts out the difference between the first rising points of time $t_x$ and t2 of the respective signals as the pulse number from the pulse generator 8, as shown in FIG. 3(c). This gate circuit 14 puts out the information representing the sign of the difference between the points of time $t_x$ and t2, as will hereinafter be described in detail. A driver unit 15 including a pulse motor or the like moves the picture-taking lens 11 by an amount corresponding to the pulse number from the gate circuit 14 in a direction corresponding to the information representing said sign therefrom to focus the lens 11 to the object $f_2$.

A null method type indicator 18 indicates the difference between the object distance corresponding to the position of the picture-taking lens 11 prior to the automatically focusing and the object distance to be focused within the selected distance range detected by the range finding system 1-7, in accordance with the output of the gate circuit 14.

Reference is now made to FIG. 4 to describe a specific example of the distance range selecting unit 4. A potentiometer 4a produces a voltage output corresponding to the distance selected within the focusable distance range of the picture-taking lens 11. A comparator 4b compares the output of the potentiometer 4a with the voltage output 9s of the step-wave generator 9. A flip-flop 4c produces a "H" level output at an l output terminal when the output of the potentiometer 4a is greater than the voltage output of the step-wave generator 9, and produces a "L" level output when the former is smaller than the latter. An m output terminal of the flip-flop 4c assumes the opposite polarity. Accordingly, the output relation between the potentiometer 4a and the step-wave generator 9 and the l output terminal of the flip-flop 4c is similar to the output relation between the potentiometer 10 and the step-wave generator 9 and the comparator 4b shown in FIGS. 2(e) and (f). A terminal 4d is used to determine whether the selected distance range is from infinity $t_o$ to the aforementioned selected distance $t_y$ as shown in FIG. 2(b) or from the nearest distance $t_e$ to the aforementioned selected distance $t_y$ as shown in FIG. 6(b), and when a "H" level input is supplied to this terminal 4d, the output of the l terminal of the flip-flop 4c shown in FIG. 2(b) appears at the output terminal of this selecting unit 4 through an AND gate 4e and an OR gate 4f. On the other hand, when a "L" level input is supplied to the terminal 4d, an AND gate 4h is opened by an inverter 4g so that the output of the m terminal of the flip-flop 4c shown in FIG. 6(b) appears at the output terminal of the selecting unit 4 through the gate 4h and an OR gate 4f. A terminal 4i is used to select the entire focusable distance range and an "H" level input may be supplied for this purpose.

A specific example of the gate circuit 14 is shown in FIG. 5. Flip-flops 14a and 14b receives as input the outputs of the shift registers 7 and 13, respectively. If the rising $t_x$ is supplied earlier than the rising $t_2$ to the flip-flop 14b as shown in FIGS. 3(a) and (b), an AND gate 14d puts out clock pulses from the pulse generator 8 for a time corresponding to the difference $(t_x-t_2)$ and in the converse case, an AND gate 14c puts out clock pulses. The outputs of these AND gates 14c and 14d are supplied to the normal rotation input terminal and the reverse rotation input terminal of the pulse motor of the driver means 16, respectively.

The operation of the first embodiment hitherto described may be summarized as follows. First, the photoelectric element 1b of the reproduction until 1 is moved at a uniform velocity from the infinity position $P_o$ to the nearest position $P_e$ by the driving system 1c to prepare the contrast signal as shown in FIG. 2(a). Simultaneously with the starting of the movement of the photoelectric element, the clock pulse generator 8 is operated and the step-wave generator 9 puts out a step voltage $9s$ which increases with time as shown in FIG. 2(e). The distance range selecting unit 4 compares this step voltage with a voltage of the potentiometer 4a (FIG. 4) corresponding to the limit of the desired distance range determined in accordance with the intention and transmits the gate signal to the gate circuit 3 by a predetermined time $(t_o-t_y)$ corresponding to the desired selected distance range, as shown in FIG. 2(b). The gate circuit 3 transmits the contrast signal to the peak detector 5 in accordance with the gate signal for the predetermined time $(t_o-t_y)$ corresponding to the desired distance range. The contrast signal so selected is transmitted to the shift register 7 through the peak detector 5 and the comparator 6. The shift register 7 is operated by the shift pulse from the aforementioned clock pulse generator 8 and memorizes the point of time $t_2$ whereat the contrast signal corresponding to the desired distance range assumes its maximum value. On the other hand, the output of the step-wave generator 9 which is operated with the start of the movement of the photoelectric element 1b is transmitted to the comparator 12 and the position whereat the picture-taking lens 11 is placed is detected by the comparison between the output voltage of the step-wave generator 9 and the voltage $10s$ corresponding to the position of the picture-taking lens 11. The shift register 13 also memorizes the point of time $t_x$ whereat the position of the picture-taking lens 11 is detected, by the shift pulse from the aforementioned clock pulse generator 8. The shift registers 7 and 13 are operated at a time and memorize the respective points of time. When the photoelectric element completes its entire stroke $P_o-P_e$, read-out in the opposite direction is effected from the shift registers 7 and 13 in synchronism therewith. The gate circuit 14, as shown in FIG. 3(c), puts out clock pulses from the outputs of the shift register 7 and 13 for a time corresponding to the difference between the point of time $t_2$ whereat the maximum contrast is detected and the point of time $t_x$ whereat the position of the picture-taking lens 11 is detected. The driver means 15 receives this output to focus the picture-taking lens 11 to the object $f_2$ having the highest contrast within the selected range.

Of course, when a distance from infinity to the intermediate distance between the objects $f_1$ and $f_2$ is selected by the distance range selecting unit 4 as indicated by dotted line in FIG. 2(b), the distance from the camera to the object $f_1$ for which the contrast signal assumes its extremal value within this range is indicated by the indicator 17f in a manner similar to that described above, and the picture-taking lens 11 is focused to the object $f_1$.

Also, when a distance from the nearest distance to the intermediate distance between the objects $f_1$ and $f_2$ is selected as shown in FIG. 6(b), the output $I_s$ of the photoelectric element 1b becomes as shown in FIG. 6(a) in the same manner as already noted, and the outputs of the peak detector 5 and the comparator 6 become as shown in FIG. 6(c) and (d), respectively, and it is also possible to focus the picture-taking lens 11 to the object $f_2$ having the highest contrast within this selected distance range.

The first embodiment so far described can obtain a satisfactory result in most cases. However, where the contrast signal $I_s$ at the point of time $t_y$ representing the limit of the selected distance range is greater than the extremal value $f_1$ of the contrast signal within the selected distance range, as shown in FIG. 7, the peak detector 5 does not detect the point of time $t_1$ for this value $f_1$ but the point of time $t_y$. Thus, the desired object $f_1$ is not in focus. This also holds true with the case of FIG. 8. In this manner, the first embodiment suffers from a disadvantage that where the selected distance range is not appropriate, the picture-taking lens 11 cannot be focused on the object within that range.

Description will now be made of a second embodiment which overcomes such disadvantage. In this embodiment, the elements functionally similar to those in the first embodiment are given similar reference characters and need not be described. Description will first be made by taking as an example the case where the distance range selecting unit 4 selects a distance range for which the automatic focusing cannot take place in the first embodiment, as shown in FIG. 10(c) and in the same manner as in FIG. 8(c). In FIG. 9, a differential coefficient discriminator circuit 21 receives the output of an amplifier 2 which is varied with time and, as shown in FIG. 10(b), produces a "H" level signal when the differential coefficient of this output is positive, and produces an "L" level signal when the differential coefficient is negative. A specific example of the differential coefficient discriminator circuit 21 is shown in FIG. 12. An AND gate circuit 22 opens a gate circuit 3 when this signal and the aforementioned signal from the distance range selecting unit 4 are at "H" level, and thereby permits the output of the amplifier 2 to be transmitted to a peak detector 5. Consequently, the output of the gate circuit 3 becomes as shown in FIG. 10(d). The outputs of the peak detector 5 and comparator 6 are provided in the same manner as that described in connection with the first embodiment and become as shown in FIGS. 10(e) and (f), respectively.

An AND gate circuit 23 applies the pulse of the clock pulse generator 8 to the CK terminal of a D-type flip-flop 24 for the range $t_y$–$t_c$ selected by the distance range selecting unit 4. The output of the comparator 6 shown in FIG. 10(f) is applied to the D terminal of the D-type flip-flop 24. After the point of time $t_y$, clock pulses is supplied to the CK terminal of the flip-flop 24 through the AND gate 23, so that the output of the flip-flop circuit 24 becomes similar to the output of the comparator 6 (FIG. 10(f)), as shown in FIG. 10(g), and a point of time $t_5$ whereat the output of the flip-flop circuit 24 finally changes from "H" level to "L" level is coincident with a point of time whereat the contrast assumes its extremal value $f_3$ within the selected distance range. More strictly, the output of the D-type flip-flop 24 is delayed by a period of the clock pulse at maximum with respect to the output of the comparator 6, but the period of the clock pulse is sufficiently small so that the two may be regarded as being substantially coincident. If the point of time $t_5$ is read out from the shift register 7 in the same manner as that described in connection with the previous embodiment, it will be possible to detect the distance of the object $f_3$. Thus, the function of the differential coefficient discriminator circuit 21 and the AND gate circuit 22 is to realize that even the maximum value of the contrast signal within the selected distance range shown in FIG. 10(c) may have a negative differential coefficient and that if not an extremal value, the peak detector 5 may not detect this maximum value.

Also, as shown in FIGS. 11(a) and (c) wherein the contrast signal at the limit $t_y$ of the selected distance range is the maximum value of the contrast signal within this selected distance range and not an extremal value but the differential coefficient thereat is positive, there may be provided the outputs of the differential coefficient discriminator circuit 21, the gate circuit 3, the peak detector 5 and the comparator 6, as shown in FIGS. 11(b), (d), (e) and (f), respectively. Since the clock pulses from the pulse generator 8 is supplied to the D-type flip-flop circuit 24 through the AND gate 23 during the time ($t_o$–$t_y$), the flip-flop 24 produces an output of the same waveform as the output waveform of the comparator 6 shown in FIG. 11(f) for the time ($t_o$–$t_y$) as shown in FIG. 11(g), but after the point of time $t_y$, namely, outside the selected distance range, the supply of the clock pulse to the flip-flop 24 is cut off, so that the output of the flip-flop 24 holds the output level, i.e. the "H" level even after the point of time $t_y$, as shown in FIG. 11(g). The point of time $t_1$ whereat the output of the flip-flop 24 finally changes from its "H" level to its "L" level represents the extremal value $f_1$ of the contrast within the selected distance range of the distance range selecting unit 4. When the point of time $t_1$ whereat the contrast becomes extremal is read out from the shift register 7, it will be possible to detect the distance of the desired object $f_1$ within the selected distance range. Thus, the function of the AND gate 23 and the D-type flip-flop circuit 24 is to realize that even the maximum value of the contrast signal within the selected distance range may have a positive differential coefficient and that if not an extremal value, this maximum value may not be detected.

In the second embodiment, the detection of the maximum value other than the extremal value of the contrast signal within the selected distance range may be thus avoided by the set of the differential coefficient discriminator circuit 21 and the AND gate 22 and the set of the AND gate 23 and the D-type flip-flop 24.

Another D-type flip-flop circuit 25 is provided to detect the position of the picture-taking lens 11 in synchronism with the aforementioned flip-flop circuit 24, and it compensates for the delay of the output signal of the flip-flop circuit 24 with respect to the detection signal of the position of the picture-taking lens. The shift register 13 receives the output of this flip-flop circuit 25. In the other points, the construction of the second embodiment is similar to that of the first embodiment and need not be described.

In FIG. 13 which shows a third embodiment of the present invention, the reproduction unit 1 includes an auxiliary lens $1_a$ moved in the direction of the optic axis by a biasing member or the like, and a fixed photoelectric element $1_b$. The auxiliary lens $1_a$ is moved between the infinity position $d_o$ and the nearest position $d_e$ and at the position $d_o$, it forms on the photoelectric element $1_b$ the image of the remotest object, namely, the infinity object, with respect to the unshown picture-taking lens to be automatically focused and at the position $d_e$, it forms on the photoelectric element $1_b$ the image of the nearest object with respect to the picture-taking lens. The photoelectric element, as shown in FIG. 14(a), puts out the variation in contrast of the image resulting from the variation in position of the picture-taking lens as an electrical signal $I_s$ (contrast signal) which is varied by the displacement of the position of the auxiliary lens $1_a$. A lens position detector device 31 receives the signal from the auxiliary lens $1_a$ of the reproduction unit 1 and converts the position of this lens into a voltage and puts out the same. The output voltage of the detector device 31 is so set that it is linearly decreased as the auxiliary lens $1_a$ is moved from the infinity position $d_o$ to the nearest position $d_e$, as shown in FIG. 14(b).

The distance range selecting unit 4 prepares a gate signal to the gate circuit 3 in accordance with the distance range selected by extraneous operation. The specific construction of this selecting unit 4 is entirely identical to the aforementioned one with the exception that the output of the position detector device 31, instead of the output of the step-wave generator 9, is applied to one input terminal of the comparator 4b of FIG. 4. By this, the potentiometer 4a of FIG. 4 is so set that the output thereof assumes the level as indicated by dot-and-dash line in FIG. 14(b), and a "L" level output is applied to the terminal 4d of FIG. 4, thereby providing a gate signal as shown in FIG. 14(c).

The amplifier 2, the gate circuit 3, the peak detector 5 and the comparator 6 are similar in construction to those in the previously described embodiments and produce the outputs as shown in FIGS. 14(d), (e) and (f) in accordance with the variation in position of the auxiliary lens $1_a$. A sample hold circuit 32 receives the signals from the lens position detector device 31 and the comparator 6 and, when the output of the comparator 6 is at "H" level, it puts outs the voltage of the detector device 31 and, when the output of the comparator 6 assumes "L" level, it holds and puts out the then voltage from the detector device 31. The output voltage of the sample hold circuit 32 shown in FIG. 14(g) represents the distance to the object lying within the selected distance range.

Another lens position detector device 33 converts into a voltage the position of the picture-taking lens which starts moving after the auxiliary lens $1_a$ has moved over its entire stroke $d_o$-$d_e$. The lens position detector devices 21 and 33 are designed so as to put out the same voltage when the respective lenses are focused to a common object. That is, the output of the detector device 33 is varied in the same manner as the output of the detector device 31 when the picture-taking lens is moved from the infinity position to the nearest position.

A comparator 34 compares the output of the sample hold circuit 32 with the output of the lens position detector device 33 and, when the latter is greater than the former, it supplies power to an electromagnet 35 and when the latter is smaller than the former, it cuts off the power supply. Therefore, when the auxiliary lens $1_a$ has completed its movement but the picture-taking lens is resting at its infinity position, the output voltage of the lens position detector device 33 is greater than the output voltage of the sample hold circuit 32 so that the electromagnet 35 is energized to attract and hold a pawl 36. Thereafter, when the picture-taking lens is moved by unshown means and the lens has reached the position $d_2$ with the output of the lens position detector device 33 decreased as shown in FIG. 14($h$), the output of the detector device 33 becomes equal to the output of the sample hold circuit 32 so that the current flowing to the electromagnet 35 is cut away to release the pawl 36. Then, the picture-taking lens is restrained at its position $d_2$ by the pawl 36 to thereby enable the picture-taking lens to be focused to an object within the selected distance range.

In the above-described embodiments, the reproduction unit 1 scans the entire focusable distance range of the picture-taking lens and generates an output relating to the distance of the object lying within that range and thus, the reproduction unit is not restricted to the present embodiment but may be applied to any range finder device and for example, the finder device disclosed in U.S. Pat. Nos. 4,002,899 and 4,059,757.

We claim:

1. An apparatus for measuring the distance between an object and the apparatus comprising:
   (1) scanning means for scanning the entire distance range to be measured, said scanning means detecting objects at different distances from the apparatus within said range and producing in a time series an output which assumes an extremal value upon the detection;
   (2) means for producing a distance signal representing the scanned distance in a time series, in synchronism with the scanning of said scanning means;
   (3) distance selecting means extraneously operable to select a desired distance range within said entire distance range to be measured;
   (4) extremal value detecting means for detecting the extremal value of the output of said scanning means corresponding to the selected distance range by the output of said distance selecting means; and
   (5) means for providing an output representing the distance between an object within said selected distance range and said apparatus from the output of said extremal value detecting means and said distance signal.

2. An apparatus according to claim 1, wherein said extremal value detecting means comprises a maximum value detecting circuit for detecting the maximum value of the output of said scanning means within said selected distance range, and means for causing said maximum value detecting circuit to detect the next maximum value when the output of said scanning means corresponding to the limit distance of said selected distance range is the greatest of the output of said scanning means corresponding to said selected distance range.

3. An apparatus according to claim 1, wherein said extremal value detecting means comprises a maximum value detecting circuit for detecting the maximum value of the output of said scanning means within said selected distance, and a circuit for rendering said maximum value detecting circuit inoperative when the differential coefficient of the output of said scanning means assuming said maximum value is other than zero.

4. An apparatus for measuring the distance between an object and the apparatus, comprising:
   (1) scanning means for scanning the entire distance range to be measured said scanning means detecting objects within said range but at different distances from the apparatus and for producing an output corresponding thereto in a time series;
   (2) means for producing a distance signal representing the scanned distance in a time series in synchronism with the scanning of said scanning means;
   (3) distance selecting means extraneously operable to select a desired distance range within the entire distance range to be measured;
   (4) means for extracting the output of said scanning means within said selected distance range in accordance with the output of said distance signal producing means corresponding to the distance range selected by said selecting means; and
   (5) means for providing an output representing the distance between an object within said selected distance range and the apparatus from the output of said extracting means.

5. An apparatus according to claim 4, wherein said extracting means comprises a gate circuit for receiving as input the output of said scanning means, and a circuit for producing a gate signal for passing through said gate circuit only the output of said scanning means corresponding to the selected distance range, from the distance signal of said distance signal producing means and the selected distance range of said selecting means.

6. An apparatus according to claim 5, wherein said scanning means produces an output of a waveform which becomes a peak when it detects an object, and said providing means comprises a peak detector for detecting the maximum peak of the output of said scanning means passed through said gate circuit, and means for producing an output representing said distance from both the point of time whereat said peak detector detects the maximum peak and the output of said distance signal producing means.

7. An apparatus according to claim 6, wherein said extracting means comprises differentiating means for differentiating the output of said scanning means and producing an output corresponding to the positive or the negative of the differentiated value, and means for preventing the production of the gate signal of said gate signal producing circuit when the output of said differentiating means is one of the positive and the negative.

8. An automatic focusing apparatus comprising:
   (1) an image forming lens system for forming the image of an object on a predetermined surface;
   (2) distance selecting means extraneously operable to select a desired distance range within the focusable distance range of said image forming lens system;

(3) range finding means for measuring the distance between an object within the selected distance range and the automatic focusing apparatus in accordance with the output of said distance selecting means; and (4) means connected to said range finding means for focusing said image forming lens system to an object within the selected distance range in accordance with the output of said range finding means.

* * * * *